United States Patent [19]

Norén

[11] Patent Number: 5,308,629
[45] Date of Patent: May 3, 1994

[54] METHOD AND PLANT FOR IMPROVING KEEPING QUALITIES OF FOOD PRODUCTS

[75] Inventor: Tommy Norén, Veberöd, Sweden

[73] Assignee: Alfa-Laval Food Engineering AB, Lund, Sweden

[21] Appl. No.: 910,134

[22] PCT Filed: Jan. 3, 1991

[86] PCT No.: PCT/SE91/00069
 § 371 Date: Jul. 9, 1992
 § 102(e) Date: Jul. 9, 1992

[87] PCT Pub. No.: WO91/11894
 PCT Pub. Date: Aug. 8, 1991

[30] Foreign Application Priority Data

Jan. 31, 1990 [SE] Sweden ................ 9000324
Jan. 23, 1991 [SE] Sweden ................ 9100201

[51] Int. Cl.⁵ .................. A23L 3/01; B65B 55/08; H05B 6/78
[52] U.S. Cl. .................. 426/234; 53/425; 99/451; 219/700; 422/21; 426/241; 426/412; 426/414
[58] Field of Search .............. 426/234, 241, 243, 412, 426/414; 53/425; 99/451; 219/10.55 A, 10.55 E, 10.55 F, 10.55 M; 422/21

[56] References Cited

U.S. PATENT DOCUMENTS

| | | | |
|---|---|---|---|
| 2,576,862 | 11/1951 | Smith et al. | 426/234 |
| 3,809,844 | 5/1974 | Stenstrom | 219/10.55 M |
| 3,809,845 | 5/1974 | Stenstrom | 219/10.55 M |
| 3,814,889 | 6/1974 | Stenstrom | 219/10.55 M |
| 4,839,485 | 6/1989 | Koch et al. | 219/10.55 A |
| 4,904,835 | 2/1990 | Koch et al. | 219/10.55 M |
| 4,962,298 | 10/1990 | Ferrari et al. | 219/10.55 A |

FOREIGN PATENT DOCUMENTS 287760 10/1988 European Pat. Off. .
351491 1/1990 European Pat. Off. .

*Primary Examiner*—Leo B. Tentoni
*Attorney, Agent, or Firm*—Davis Hoxie Faithfull & Hapgood

[57] ABSTRACT

For improving the keeping qualities of certain food products, especially sliced meat products, it is suggested that the food products immediately after they have been packed are subjected to a heat treatment by means of microwave energy, so that they are maintained at a temperature in the interval 50°-80° C., preferably 50°-70° C., during a time period of 5-60 seconds. The food products (12) are moved by means of an endless belt (9) in a path across an elongated wave guide (15, 21) which has at least one slot (19; 22, 23) extending across the whole food products movement path.

12 Claims, 4 Drawing Sheets

METHOD AND PLANT FOR IMPROVING KEEPING QUALITIES OF FOOD PRODUCTS

FIELD OF THE INVENTION

The present invention relates to a method and apparatus for rapidly and simply improving the keeping qualities of various food products.

BACKGROUND OF THE INVENTION

The background of the invention is that is has proved possible by means of a relatively moderate heat treatment substantially to improve the keeping qualities of the kind of food products which are not deep frozen or sterilized but are maintained in a fresh state until prepared for consumption. Such food products are for instance sliced meat products, such as sausage, ham, etc. One reason for the fact that improved keeping qualities can be achieved particularly in connection with sliced food products is assumed to be that a small amount of bacteria often may be added in connection with the slicing operation and the subsequent packing, which puts a limit to the keeping qualities of the food products. It has been shown that the effect of these bacteria may be reduced substantially if the food products are subjected to a relatively moderate heat treatment immediately after the slicing operation. The invention thus aims at enabling in a rapid and simple way improvement of the keeping qualities of for instance such food products.

Apparatus has previously been known for rapid heat treatment of packed food products by means of microwave energy. However, known apparatus of this kind, as a rule, have a relatively complicated construction and often include sophisticated equipment for accomplishing an even heat treatment effect in the packed products.

Thus, US-A-3.809.844, US-A-3.809.845 and US-A-3.814.889 describe plants in which food products are subjected to an accurately controlled heat treatment before they are heated by means of microwave energy and, moreover, are cooled during the microwave heating by means of a surrounding fluid in order not to get too high a surface temperature.

EP-A1-0.287.760 describes a plant in which packed food products are placed at accurately determined intervals on an endless belt, on which they are moved intermittently and subjected to microwave heating in different heat treatment zones. Microwave applicators arranged at the heat treatment zones are formed in a particular way with regard to the shape of the food products and are arranged to be moved towards and away from the food products during the microwave heating, when the endless belt keeps the food products stationary in the heat treatment zones.

EP-A1-0.351.491 describes an apparatus in which packed food products are placed in several parallel rows on an endless belt and are moved by the belt under a number of microwave applicators, each one of which is arranged for heat treatment of the food products in only one of the rows. The food products have to be placed very accurately on the endless belt to be subjected to the intended heat treatment under the microwave applicators. At least one of the microwave applicators for each row of food products has the shape of an elongated wave guide extending along the movement path of the food products and has several slots distributed along said movement path, through which the microwaves may radiate and hit the passing food products.

None of the above described known plants are, in practice, suitable for resolving the particular problem to which the present invention is directed. The known plants are either too complicated and expensive or are imperfect from a functional point of view.

An object of the present invention is, thus, to provide a method and a plant for rapidly performing a relatively moderate heat treatment of relatively thin separate food products for improvement of their keeping qualities. It is important that the heat treatment be performed simply and cheaply, i.e. a plant for the performing of the heat treatment should be inexpensive and be very easy to use. For instance it should be simple to feed the food products into the plant. Furthermore, the plant should be usable without costly reconstruction for heat treatment of food products having somewhat different shape and size.

SUMMARY OF THE INVENTION

To achieve these objects the invention provides that food products, the keeping qualities of which are to be improved, are first packed in a material transparent to microwaves and are then by means of an endless belt moved serially through a heat treatment zone, microwaves being generated in at least one elongated hollow wave guide and being caused to propagate in the longitudinal direction thereof. The food products are moved by means of the endless belt in a path across the longitudinal direction of the wave guide, and a microwave field is provided by means of the wave guide, extending across the whole of the movement path so that the food products in their entirety will pass through the microwave field.

In an apparatus according to the invention said wave guide has at least one elongated slot extending across the entire movement path of the food products. Microwaves generated and caused to propagate within the wave guide may be allowed to leak out through such an elongated slot, the food products being moved by the endless belt past the wave guide outside the slot. It has proved possible in such an arrangement to maintain a very stable microwave field in the wave guide and, thereby, to accomplish a well controlled microwave heating of the food products passing outside. Alternatively, the wave guide may have two slots which extend in parallel in opposite walls of the wave guide, the food products being moved by the endless belt in through one of the slots and out through the other.

Preferably, a plant according to the invention comprises two or more wave guides, which are placed after each other along the movement path of the food products. By this means, the temperature may be raised rapidly in the food products without any risk of overheating the surface layers of the food products.

In the embodiment of the invention, in which microwave energy is allowed to leak out through a slot in a wave guide, two such wave guides may be arranged opposite to each other on the respective sides of the part of the endless belt that supports the food products. The endless belt then has to be transparent to microwaves.

A plant according to the invention preferably is arranged for heat treatment of the food products such that these are maintained at a temperature in the range of 50°-80° C., preferably 50°-70° C., during a time period of 5-60 seconds. It has proved that such a heat treatment leads to a doubling of the keeping time possible for products such as sliced ham, sausage and liver paste.

With regard to the gradual attenuation of the microwaves, when they propagate into a food product, it is important that the food products be relatively thin. Their thickness should not exceed 10 mm and preferably be less than 8 mm. The extension of the food products in the plane of the endless belt, or the location of the food products on the endless belt, may be allowed to vary. It is important though that the extension of the food products across the endless belt is not larger than that of the generated microwave field.

The invention may be used in a simple manner in connection with existing packing lines, which include for instance a vacuum packing machine. It can also be used in a simple manner in connection with manual packing of food products.

BRIEF DESCRIPTION OF THE DRAWING

The invention will be further described with reference to the accompanying drawing, in which.

DETAILED DESCRIPTION OF THE INVENTION

Figure 1:
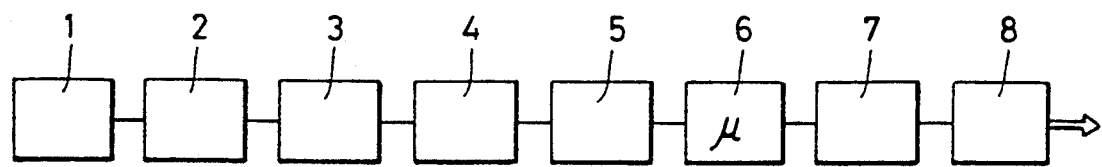
FIG. 1 is a block diagram of a plant in which the invention is used.

FIG. 1 is a block diagram and illustrates a plant comprising a cutting machine 1 for slicing of sausage, ham or the like, a weighing machine 2 for weighing the cut slices, a sorting device 3 for providing portions each containing a number of slices, a supply device 4 and a packing machine 5, e.g. a vacuum packing machine. The supply device 4 is arranged to receive portions from the sorting device and to place them at predetermined places in the packing machine 5. The plant in FIG. 1 further comprises an apparatus 6 for heat treatment of the packed portions, equipment 7 for weighing and labelling the packed portions after the heat treatment and a so called cartoning machine 8.

Figure 2:
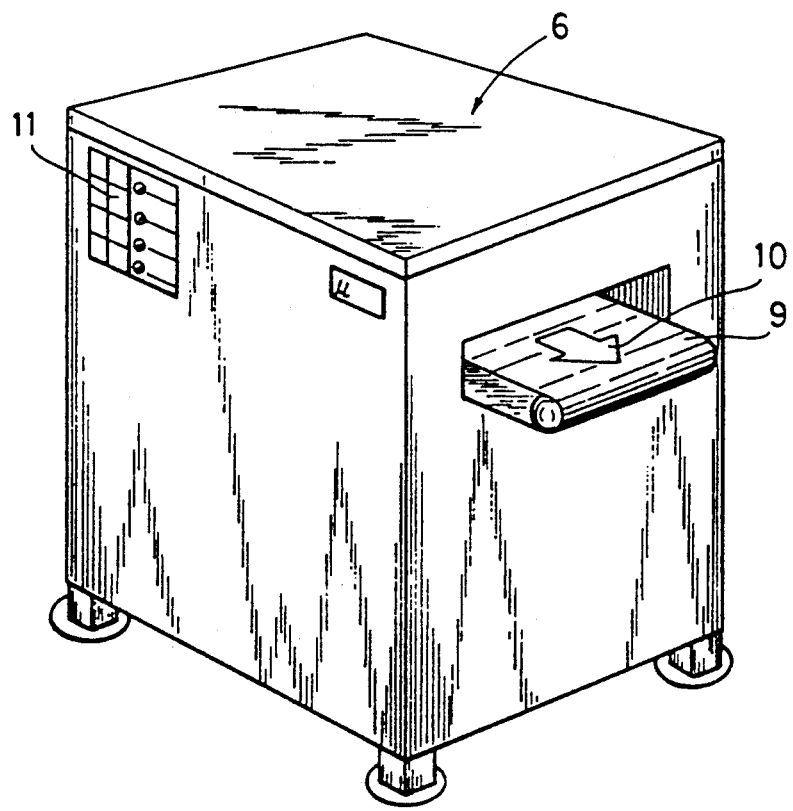
FIG. 2 is a perspective view of an apparatus for heat treatment of food products, in accordance with the invention

FIG. 2 shows a heat treatment apparatus 6 in accordance with the invention. This has an endless belt 9 arranged to move packed food products as illustrated by an arrow 10 through a heat treatment zone in the apparatus. The reference numeral 11 refers to an operating unit for the heat treatment apparatus.

Figure 4:
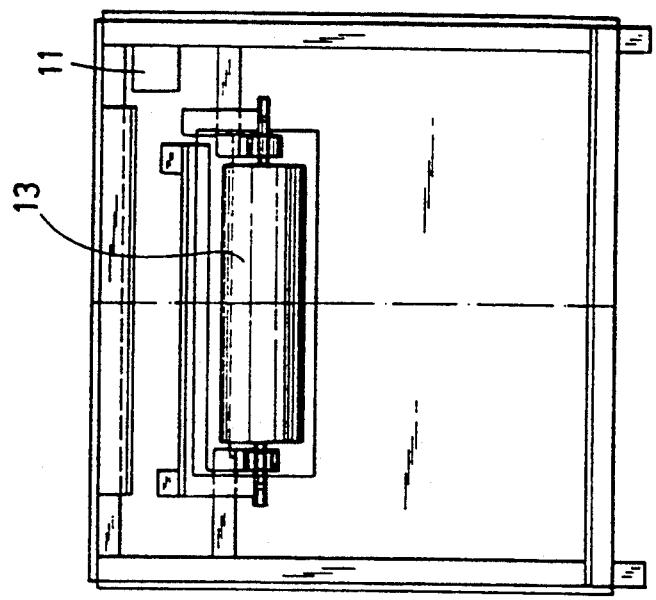
FIG. 4 shows a cross-section through the apparatus of FIG. 2.
Figure 3:
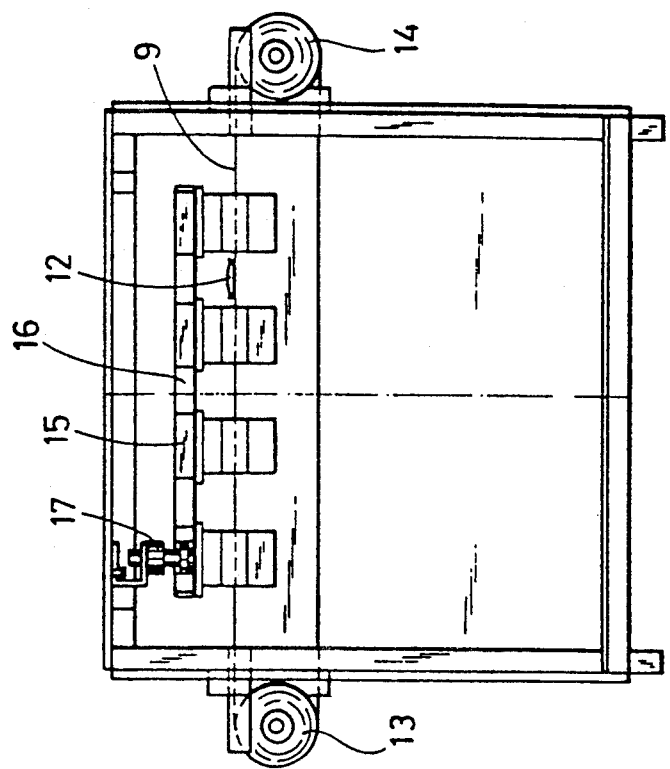
FIG. 3 shows a longitudinal section through the apparatus of FIG. 2.

FIGS. 3 and 4 show longitudinal and cross sections, respectively, of the heat treatment apparatus of FIG. 2.

As can be seen, the endless belt 9 supporting a packed food product 12 is arranged to be driven around two rolls 13, 14. Resting on an upper horizontal part of the endless belt 9 the food product 12 is intended to be moved, preferably at a constant velocity, in a path past a number of microwave applicators 15. FIG. 3 shows four pairs of microwave applicators (see also FIG. 7), which are all supported by a common supporting means 16. The supporting means 16 is adjustable vertically in relation to the endless belt 9 by means of separate adjusting means 17.

Figure 5:
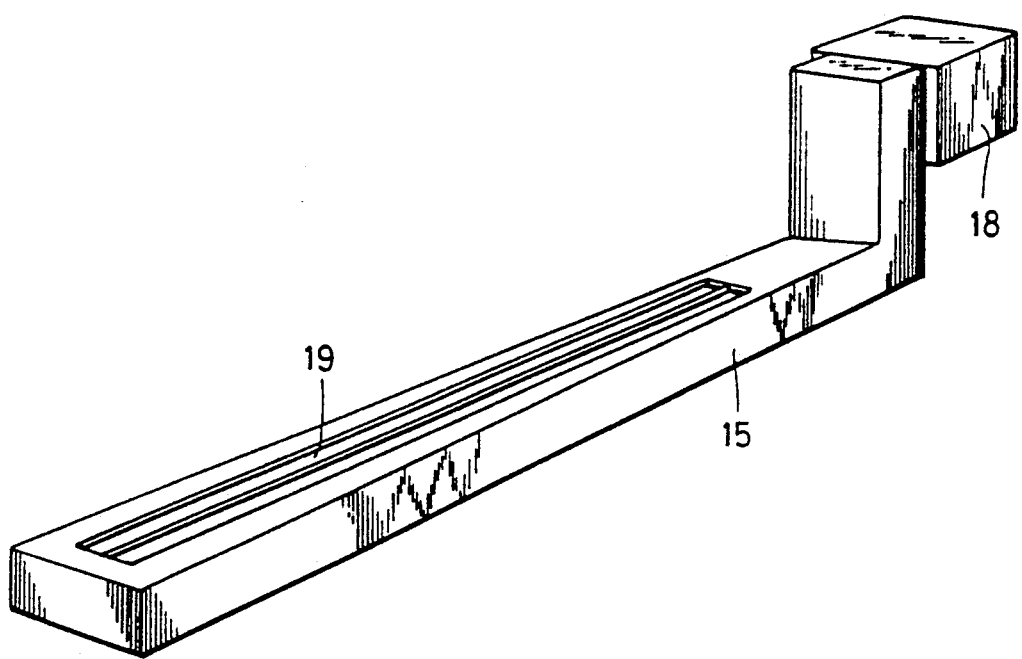
FIG. 5 shows a combined wave guide/microwave applicator and a microwave generator connected thereto.
Figure 6:
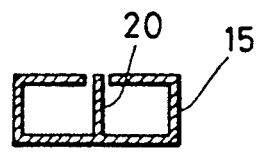
FIG. 6 shows a cross-section through the wave guide in FIG. 5.

FIGS. 5 and 6 show a microwave applicator 15 in closer detail. The microwave applicator comprises an elongated wave guide which at one end supports a magnetron 18, i.e. a microwave generator. The wave guide forms an elongated space rectangular in cross-section and confined by four thin surrounding walls. For the normally used microwave frequency, 2450 MHz, the space of the wave guide should have a cross-section of $9 \times 4{,}7$ cm.

A slot 19 extends along the wave guide through one of its surrounding walls which are about 9 cm wide. Opposite to this slot the other surrounding wall of the wave guide also about 9 cm wide supports a partition 20 which extends up into the slot 19 and along the whole of the wave guide, so that the partition divides the space in the wave guide into two equally sized parts.

Each elongated microwave applicator 15 is arranged in the heat treatment apparatus (FIGS. 2–4) such that it extends across the path, along which the food products 12 are intended to be moved by the endless belt 9. The slot 19 faces the movement path of the food products and has a length that is about as large as the width of the endless belt 9. Thus, all parts of the food products being moved on the belt 9 will pass the microwave applicator opposite to the slot 19 and safely be radiated by microwave energy leaking out therethrough. Within each wave guide, along which microwaves propagate from the magnetron 18, so called standing waves are generated, and microwave energy leaks out through the slot 19 in the form of a thin layer. When a food product passes through such a layer of microwave energy, i.e. a so called microwave field, successive portions of the food product will be rapidly heated but after that will be subjected to cooling by the surrounding atmosphere as soon as they have left the layer.

Figure 7:
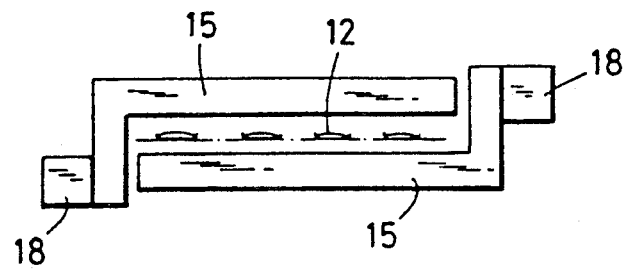
FIG. 7 shows two wave guides/microwave applicators of the kind shown in FIG. 5 arranged on the sides of a belt supporting food products.

As can be seen from FIG. 7, two microwave applicators may be placed on respective sides of an endless belt, on which food products 12 are transported. The endless belt as well as the food product packaging material have to be transparent to microwaves. When two microwave applicators are placed in the manner shown in FIG. 7, it may be suitable to arrange them in a way such that the standing waves in one of them are 90° out of phase relative to the standing waves in the other. In this way, the best conditions are obtained for an even heating effect in the passing food products.

FIG. 3 shows four pairs of microwave applicators, as illustrated in FIG. 7, arranged one after another along the endless belt 9. Each of these pairs of microwave applicators may be arranged in one layer of microwave energy to raise the average temperature within passing food products by 20° C. If in connection with such a temperature rise a certain temperature difference appears between the surface layer and the interior of a food product, this temperature difference will rapidly disappear after the relevant parts of the food product have left the layer of microwave energy. The end temperature after the fourth temperature rise may be in the range of 65°-70° C.

Figure 8:
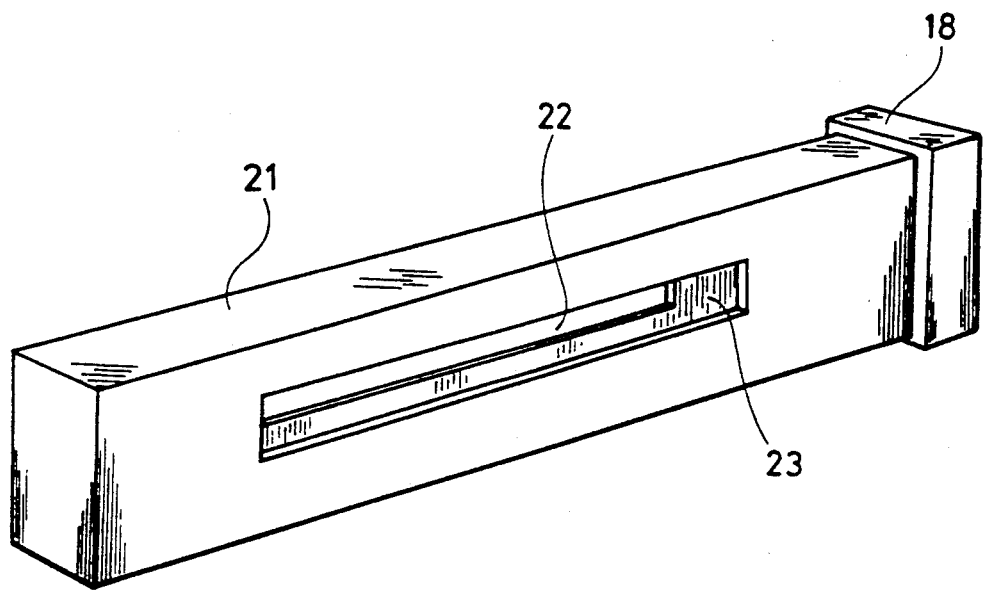
FIG. 8 shows an alternative embodiment of a wave guide/microwave applicator.
Figure 9:
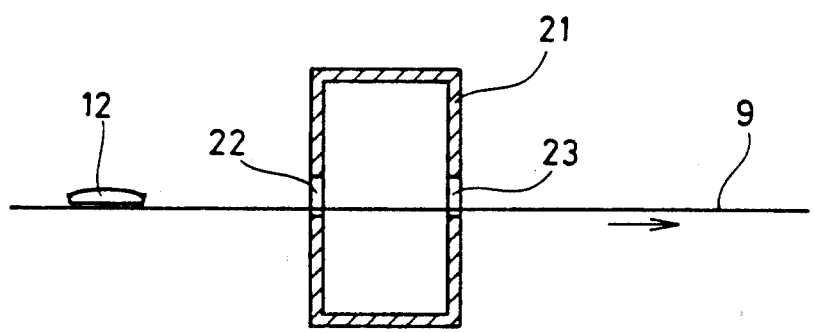
FIG. 9 shows a cross-sectional view of the wave guide/microwave applicator according to FIG. 8 and a food product being moved on a belt through the wave guide/microwave applicator.

FIGS. 8 and 9 show an alternative embodiment of a microwave applicator. This microwave applicator, designated 21, also comprises an elongated wave guide. In two opposite walls the wave guide has slots 22 and 23 extending in parallel with each other in the longitudinal direction of the wave guide.

In this case the endless belt 9 is intended to be arranged to move the food products across and through the wave guide 21, i.e. in through one of the slots and out through the other. Even in a wave guide/microwave applicator of this kind standing waves are generated, forming a microwave field through which the food products are moved. The standing waves are generated such that they do not to a substantial degree leak out through the slots 22 and 23.

By means of an apparatus of the above described kind food products may very easily be subjected to a short duration heat treatment, so that their keeping qualities is substantially improved. If for instance the food products are cut in slices and then are packed manually, the packed food products may be placed without special accuracy requirements on the endless belt 9 in a heat treatment apparatus according to FIGS. 2-4. An important matter in connection with the invention is that the heat treatment is performed immediately after the cutting and packaging of the food products.

I claim:

1. A method for improving the keeping quality of a food product which comprises packing the product in a plurality of packages formed of a material transparent to microwaves, providing a heat treatment zone having means for moving said packages along a path through said zone, said zone having a hollow elongated wave guide with a long axis transverse to said path, propagating microwaves in said wave guide in the direction of said long axis and moving said food packages through the microwaves in a direction transverse to the direction of propagation of said microwaves, each of said packages being passed in its entirety through said microwaves.

2. A method for improving the keeping quality of a food product which comprises packing the product in a plurality of packages formed of a material transparent to microwaves, providing a heat treatment zone having means for moving said packages along a path through said zone, said zone having a hollow elongated wave guide with a long axis transverse to said path, propagating microwaves in said wave guide in the direction of said long axis and moving said food packages through said wave guide transverse to the longitudinal axis of said wave guide, each of said packages being passed in its entirety through said microwaves.

3. Apparatus for improving the keeping qualities of a food product comprising means for packaging quantities of the product in packages of a material transparent to microwaves, means for moving said packages serially along a treatment path, heating means for heating said packages by microwave energy, said heating means comprising a microwave generator and an elongated hollow wave guide connected to said generator, said wave guide having a long axis and a longitudinal slot and being positioned so that said axis and said slot extend transversely across said path, said generator being connected to said wave guide to propagate microwaves in said wave guide in a direction along the axis of said wave guide.

4. Apparatus for improving the keeping qualities of a food product comprising means for packaging quantities of the product in packages of a material transparent to microwaves, means for moving said packages serially along a treatment path, heating means for heating said packages by microwave energy, said heating means comprising a microwave generator and an elongated hollow wave guide connected to said generator, said wave guide having a longitudinal axis, walls and two slots extending in parallel in opposite walls and said means for moving said packages comprising an endless belt arranged to move the food products into said wave guide through one slot and out through the other slot, said wave guide being positioned so that said axis extends transversely across said path, said generator being connected to said wave guide to propagate microwaves in said wave guide in a direction along the axis of said wave guide.

5. A method according to claim 1, wherein the food products are caused to pass through the microwaves immediately after they have been packed.

6. A method according to claim 1, wherein the food products are cut, before they are packed.

7. A method according to claim 1, wherein the food products are cut, immediately before they are packed, and are caused to pass through the microwave field immediately after they have been packed.

8. A method according to claim 1, wherein the food products are subjected to a heat treatment by means of microwaves such that they are maintained at a temperature in the interval 50°-80° C., during a time period of 5-60 seconds.

9. A method according to claim 1, wherein the microwaves are caused to propagate out through a slot in the wave guide, extending in the longitudinal direction of the wave guide, and the food products are moved past the wave guide outside the slot.

10. A method according to claim 9, wherein microwaves are generated and caused to propagate within two wave guides, the microwaves being caused to propagate out through slots in the wave guides in a way such that they hit food products being moved by means of the endless belt from opposite directions.

11. Apparatus according to claim 3, wherein said means for moving said packages comprises an endless belt arranged to move the food products past the wave guide outside said slot.

12. A plant according to claim 11, wherein two wave guides are arranged in parallel and opposite to each other on the respective sides of the endless belt, the slots of the wave guides facing the endless belt.

* * * * *